US009681180B2

(12) United States Patent
Sullivan et al.

(10) Patent No.: US 9,681,180 B2
(45) Date of Patent: *Jun. 13, 2017

(54) APPARATUS AND METHOD FOR COMMUNICATING MEDIA BETWEEN COMMUNICATION DEVICES

(71) Applicant: AT&T Intellectual Property I, LP, Atlanta, GA (US)

(72) Inventors: Marc Sullivan, Austin, TX (US); James Pratt, Round Rock, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/516,688

(22) Filed: Oct. 17, 2014

(65) Prior Publication Data
US 2015/0040170 A1 Feb. 5, 2015

Related U.S. Application Data

(63) Continuation of application No. 13/653,742, filed on Oct. 17, 2012, now Pat. No. 8,893,211, which is a
(Continued)

(51) Int. Cl.
*H04N 21/4363* (2011.01)
*H04N 21/81* (2011.01)
*H04N 21/4786* (2011.01)
*H04N 21/478* (2011.01)
*H04N 21/6587* (2011.01)
(Continued)

(52) U.S. Cl.
CPC ....... *H04N 21/43637* (2013.01); *H04L 67/16* (2013.01); *H04N 21/2223* (2013.01); *H04N 21/41407* (2013.01); *H04N 21/4781* (2013.01); *H04N 21/4786* (2013.01); *H04N 21/6587* (2013.01); *H04N 21/8173* (2013.01)

(58) Field of Classification Search
CPC ......... H04N 21/2223; H04N 21/41407; H04N 21/43637; H04N 21/4781; H04N 21/4786; H04N 21/6587; H04N 21/8173; H03J 2200/25; H03J 2200/26; H03J 2200/22
See application file for complete search history.

(56) References Cited

U.S. PATENT DOCUMENTS 6,426,705 B1 * 7/2002 Wischoeffer ........... G08C 17/00
340/12.27
7,376,441 B2 5/2008 Lee
(Continued)

FOREIGN PATENT DOCUMENTS

JP 2005328394 11/2005
NZ 500203 2/2002
(Continued)

*Primary Examiner* — Rong Le
(74) *Attorney, Agent, or Firm* — Guntin & Gust, PLC; Matthew Tropper

(57) ABSTRACT

A system that incorporates teachings of the present disclosure may include, for example, a display device having a controller to wirelessly receive media; wirelessly receive control signals for presentation of the media from a mobile communication device; and selectively disable control by the display device over presentation of the media on the display device. Additional embodiments are disclosed.

20 Claims, 5 Drawing Sheets

Related U.S. Application Data continuation of application No. 11/781,694, filed on Jul. 23, 2007, now Pat. No. 8,316,410.

(51) Int. Cl.
*H04N 21/222* (2011.01)
*H04N 21/414* (2011.01)
*H04L 29/08* (2006.01)

(56) References Cited

U.S. PATENT DOCUMENTS

| | | |
|---|---|---|
| 8,335,493 B2 | 12/2012 | Angelhag |
| 2002/0162109 A1* | 10/2002 | Shteyn ............... H04N 7/17336 725/87 |
| 2003/0002638 A1* | 1/2003 | Kaars .................. G06F 3/033 379/110.01 |
| 2003/0232593 A1 | 12/2003 | Wahlroos |
| 2005/0120381 A1 | 6/2005 | Yamaguchi |
| 2005/0186988 A1* | 8/2005 | Lim ................... H04N 21/4126 455/557 |
| 2006/0172700 A1 | 8/2006 | Wu |
| 2006/0270452 A1 | 11/2006 | Gerzberg |
| 2007/0124792 A1 | 5/2007 | Bennett |
| 2007/0202923 A1 | 8/2007 | Jung |
| 2008/0088474 A1* | 4/2008 | Hardacker ............ G08C 17/02 340/13.26 |
| 2008/0113655 A1* | 5/2008 | Angelhag ............. H04L 67/16 455/414.2 |
| 2008/0148331 A1 | 6/2008 | Walter |
| 2008/0263618 A1 | 10/2008 | White |
| 2011/0157476 A1 | 6/2011 | Arling |
| 2013/0125176 A1 | 5/2013 | Kahn et al. |

FOREIGN PATENT DOCUMENTS

| | | |
|---|---|---|
| WO | 0044168 | 7/2000 |
| WO | 0167315 | 9/2001 |

* cited by examiner

100

200

500

APPARATUS AND METHOD FOR COMMUNICATING MEDIA BETWEEN COMMUNICATION DEVICES

CROSS-REFERENCE TO RELATED APPLICATIONS

This application is a continuation of U.S. patent application Ser. No. 13/653,742, filed Oct. 17, 2012, which is a continuation of U.S. patent application Ser. No. 11/781,694, filed Jul. 23, 2007, which are incorporated herein by reference in their entirety.

FIELD OF THE DISCLOSURE

The present disclosure relates generally to communication systems, and more specifically to an apparatus and method for communicating media between communication devices.

BACKGROUND

Mobile phones can receive and store various media including images and video. However, due to the small size of the display and limited resolution, the mobile phones do not present the media as well as other devices. The media can be saved on a removable storage medium, such as a USB key, and presented on another display device, such as a computer. However, this can be a time-consuming effort and not all communication devices are compatible. Transferring the media via an intermediary source also results in multiple copies of the media being made, which may cause the media to be proliferated undesirably.

DETAILED DESCRIPTION

In a first embodiment of the present disclosure, a computer-readable storage medium can have computer instructions for wirelessly receiving media from a multimode mobile communication device for presentation on a display device, wirelessly receiving control signals for control of presentation of the media from the multimode mobile communication device, and selectively disabling control by the display device over presentation of the media on the display device.

In a second embodiment of the present disclosure, a multimode communication device can have a controller to wirelessly communicate with another communication device using a first mode of communication; wirelessly transmit media to a display device using a second mode of communication, and wirelessly transmit control signals to the display device for control of the presentation of the media on the display device.

In a third embodiment of the present disclosure, a display device can have a controller to wirelessly receive media, wirelessly receive control signals for presentation of the media from a mobile communication device, and selectively disable control by the display device over presentation of the media on the display device.

In a fourth embodiment of the present disclosure, a method of presenting media can involve wirelessly transmitting media to a display device, wirelessly transmitting control signals for presentation of the media from a multimode mobile communication device, and selectively disabling control by the display device over presentation of the media on the display device.

Figure 1:
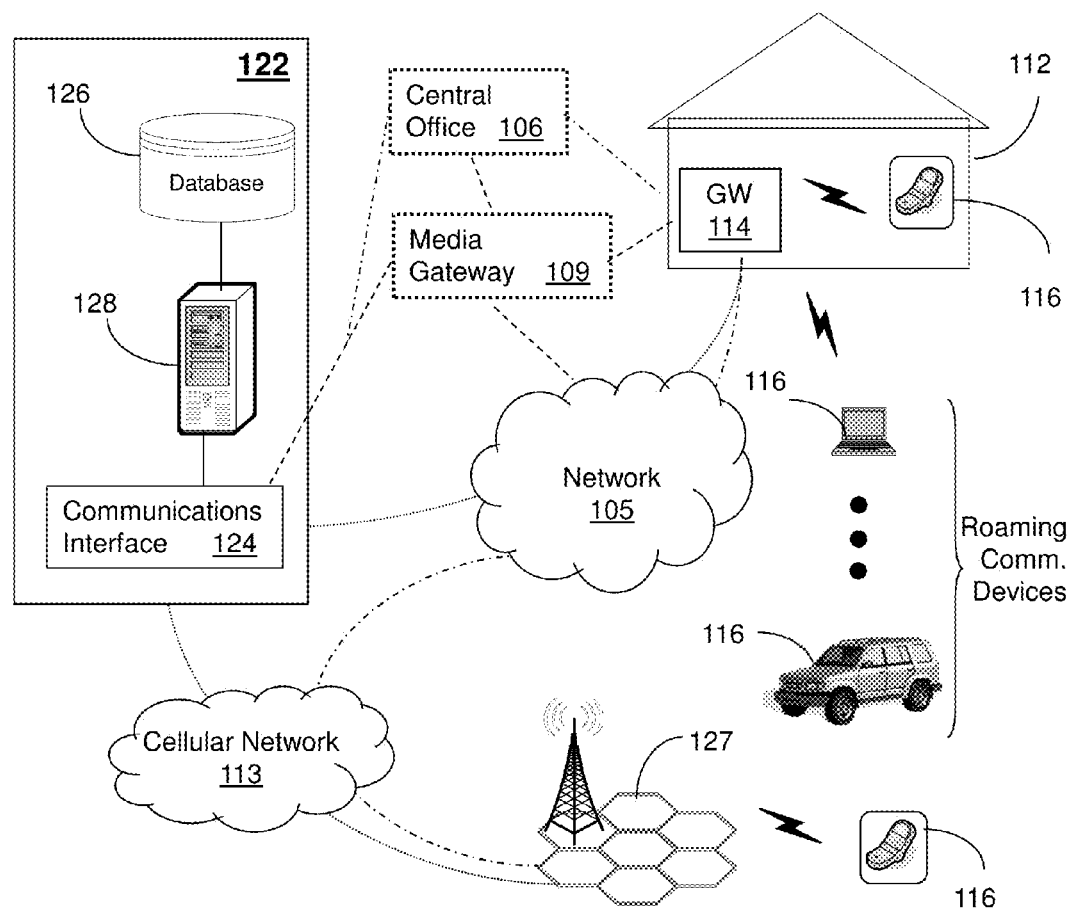
FIGS. 1 and 2 depict exemplary embodiments of a communication system.

FIG. 1 depicts an exemplary embodiment of a mobile communication device 116 communicating by way of wireless access points (WAPs) and/or wired infrastructure with other communication devices and/or a network proxy or web server 122, which collectively operate in a communication system 100. The communication device 116 can be a multimode communication device, such as a multimode VoIP terminal. However, the present disclosure contemplates the use of other types of communication devices, including other types of voice, video and data devices. The communication system 100 can comprise a packet-switched network 105. The packet-switched network can be an Internet Service Provider (ISP) network 105. The network 105 can be coupled to the network proxy 122, the cellular network 113 and network elements located in one or more of the buildings 112 representing an enterprise or residence. The ISP network 105 utilizes technology for transporting Internet traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications.

The cellular network 113 can support voice and data services over a number of access technologies such as GSM-GPRS, EDGE, CDMA-1x, UMTS, WiMAX, software defined radio (SDR), and other known and future technologies. The cellular network 113 can be coupled to base stations 127 under a frequency-reuse plan for communicating over-the-air with roaming VoIP terminals 116.

Figure 2:
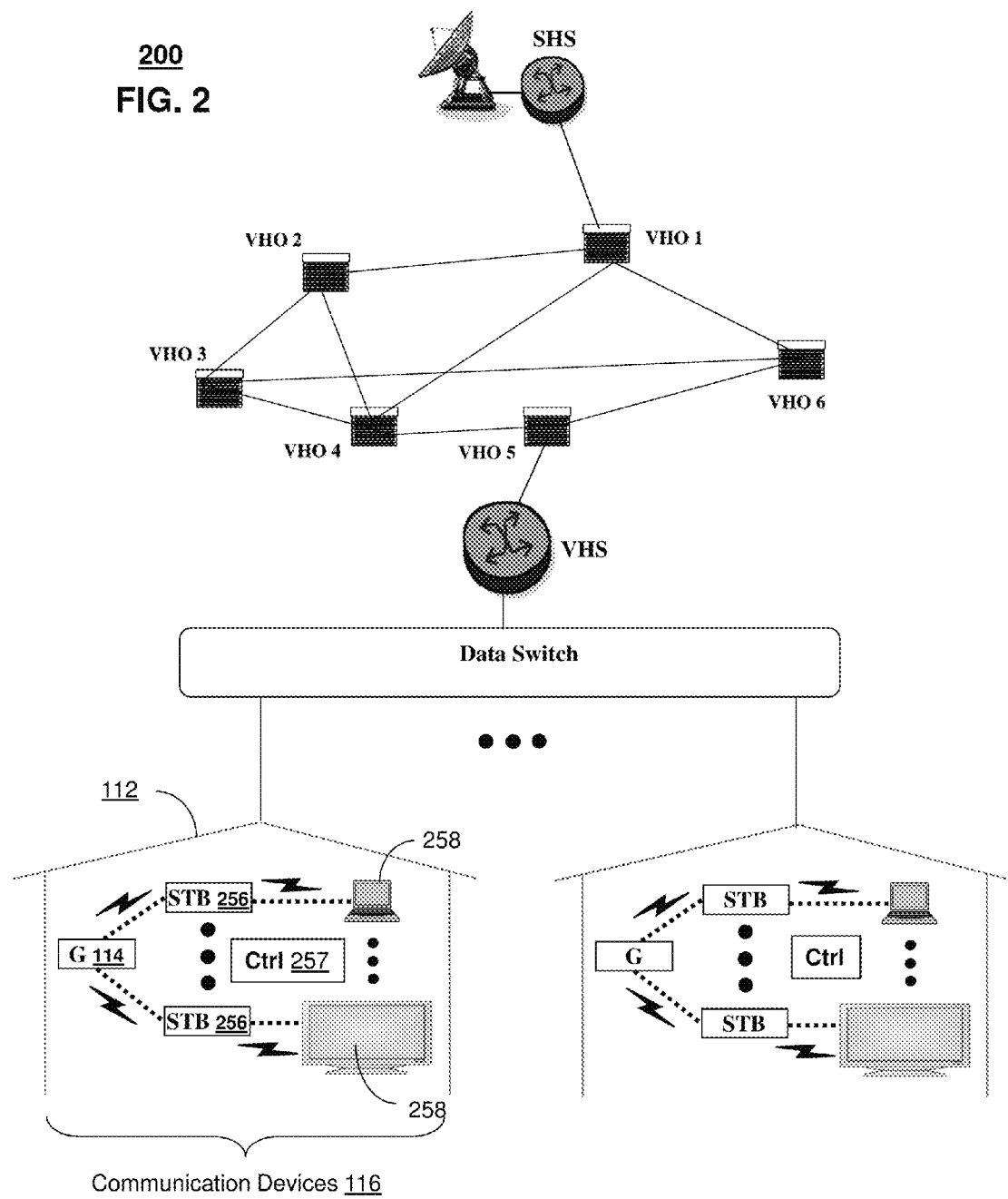

FIG. 2 depicts an exemplary embodiment of a communication system 200 embodying an IPTV service. Communication system 200 can be overlaid or operably coupled with communication system 100 as another representative embodiment of communication system 100. In a typical IPTV backbone, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 112 housing the gateway 114 (e.g., a residential gateway or RG) that distributes broadcast signals to receivers such as Set-Top Boxes (STBs) 256 which in turn present broadcast selections or media programs to media devices 258 such as computers or television units managed in some instances by a media controller 257 (e.g., an infrared or RF remote control).

Unicast traffic can also be exchanged between the STBs 256 and the subsystems of the IPTV communication system 200 for services such as video-on-demand (VoD). Although not shown, the aforementioned multimedia system can also be combined with analog broadcast distributions systems.

Figure 3:
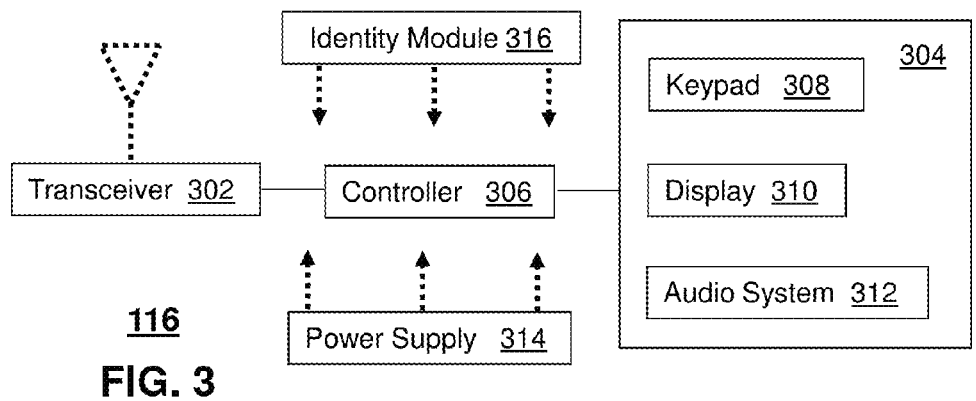
FIGS. 3 and 4 depict exemplary embodiments for a communication device operating in portions of one or both of the communication systems.

FIG. 3 depicts an exemplary embodiment of the wireless communication device 116. The communication device 116 can comprise a wireless transceiver 302, a user interface (UI) 304, a power supply 314, and a controller 306 for managing operations thereof. The transceiver 302 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1x, W-CDMA/HSDPA, UMTS, GSM/GPRS, TDMA/EDGE, and EVDO. SDR can be utilized for accessing a public or private communication spectrum according to any number of communication protocols that can be dynamically downloaded over-the-air to the communication device 116. It should be noted also that next generation wireless access technologies can be applied to the present disclosure.

In one embodiment, the communication device 116 can be a multimode device that has a first mode of communication for wirelessly communicating over longer distances (e.g., cellular communication) and a second mode of communication for wirelessly communicating over shorter distances (e.g., 802.11 communication). Any number of modes of communication can be utilized by the multimode communication device 116. In one embodiment, the communication device 116 can have various components that allow for the detection of a mode of communication being utilized by another device (e.g., a set-top box with WiMAX communication ability). One or more of the same components can be utilized for communicating using the different modes of communication, and/or multiple components having the same or similar function (e.g., multiple transceivers) can also be utilized by the communication device 116.

The UI 304 can include a keypad 308 with depressible or touch sensitive navigation disk and keys for manipulating operations of the communication device 116. The UI 304 can further include a display 310 such as monochrome or color LCD (Liquid Crystal Display) for conveying images to the end user of the communication device 116, and an audio system 312 that utilizes common audio technology for conveying and intercepting audible signals of the end user.

The power supply 314 can utilize common power management technologies such as replaceable batteries, supply regulation technologies, and charging system technologies for supplying energy to the components of the communication device 116 and to facilitate portable applications. In stationary applications, the power supply 314 can be modified so as to extract energy from a common wall outlet and thereby supply DC power to the components of the communication device 116. The controller 306 can utilize computing technologies such as a microprocessor and/or digital signal processor (DSP) with associated storage memory such a Flash, ROM, RAM, SRAM, DRAM or other like technologies for controlling operations of the aforementioned components of the communication device 116. The memory of the controller 306 can have personalized data stored therein including contact book entries, calendar entries, still pictures, ring tones, wallpapers, music, video recordings, movies and games.

The communication device 116 can also comprise an identity module 316. In one embodiment, the identity module 316 can be removably connectable to the communication device 116 to provide for selective coupling with the controller 306 of the communication device. The identity module 316 can have a memory for storage of various data including an international circuit card identification (IC-CID), international mobile subscriber identity (IMSI), an authentication key (Ki), a local area identity (LAI), a short message service center (SMSC) number, service provider name (SPN), service dialing numbers (SDN), and value added service (VAS) applications. The data can also be personalized data including contact book entries, calendar entries, still pictures (e.g., JPEG or GIF files), ring tones (e.g., MIDI files), wallpapers, audio (e.g., MP3 files), video recordings (e.g., captured by a camera coupled with the communication device 116), movies (e.g., MP4 or WAV files), and games.

In one embodiment, the identity module 316 can be a subscriber identity module (SIM) card, a universal subscriber identity module (USIM) card or a removable user identification module (RUIM) card. In another embodiment, the identity module 316 can be a Willcom-SIM (W-SIM) card having one or more core components of the mobile communication device 116 therein, such as a W-SIM card for a cellular telephone with the radio receiver and transmitter built in the card.

Figure 4:
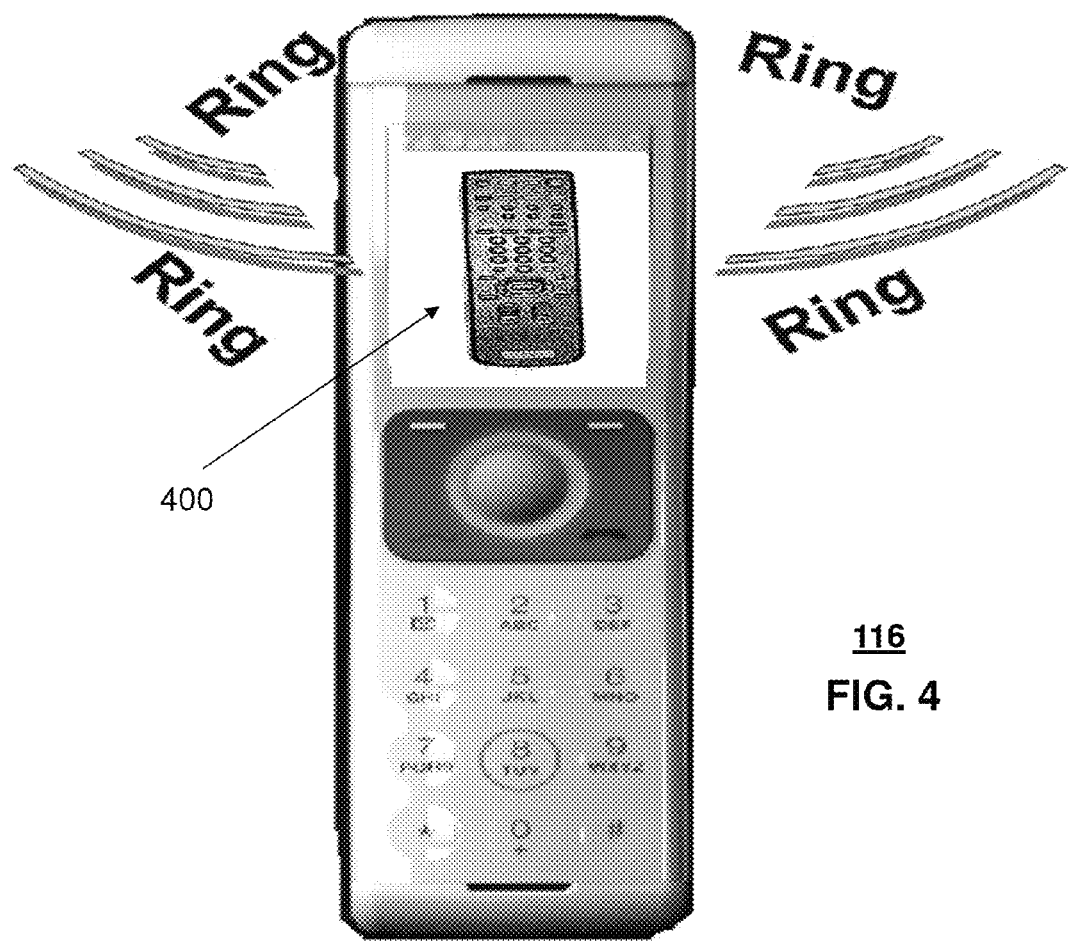

FIG. 4 depicts another exemplary embodiment of the wireless communication device 116 having a remote control emulator 400. The emulator 400 can be various types of remote control devices (e.g., a TV remote control) with corresponding remote control function keys that can be manipulated through use of the keys on the communication device 116.

Figure 5:
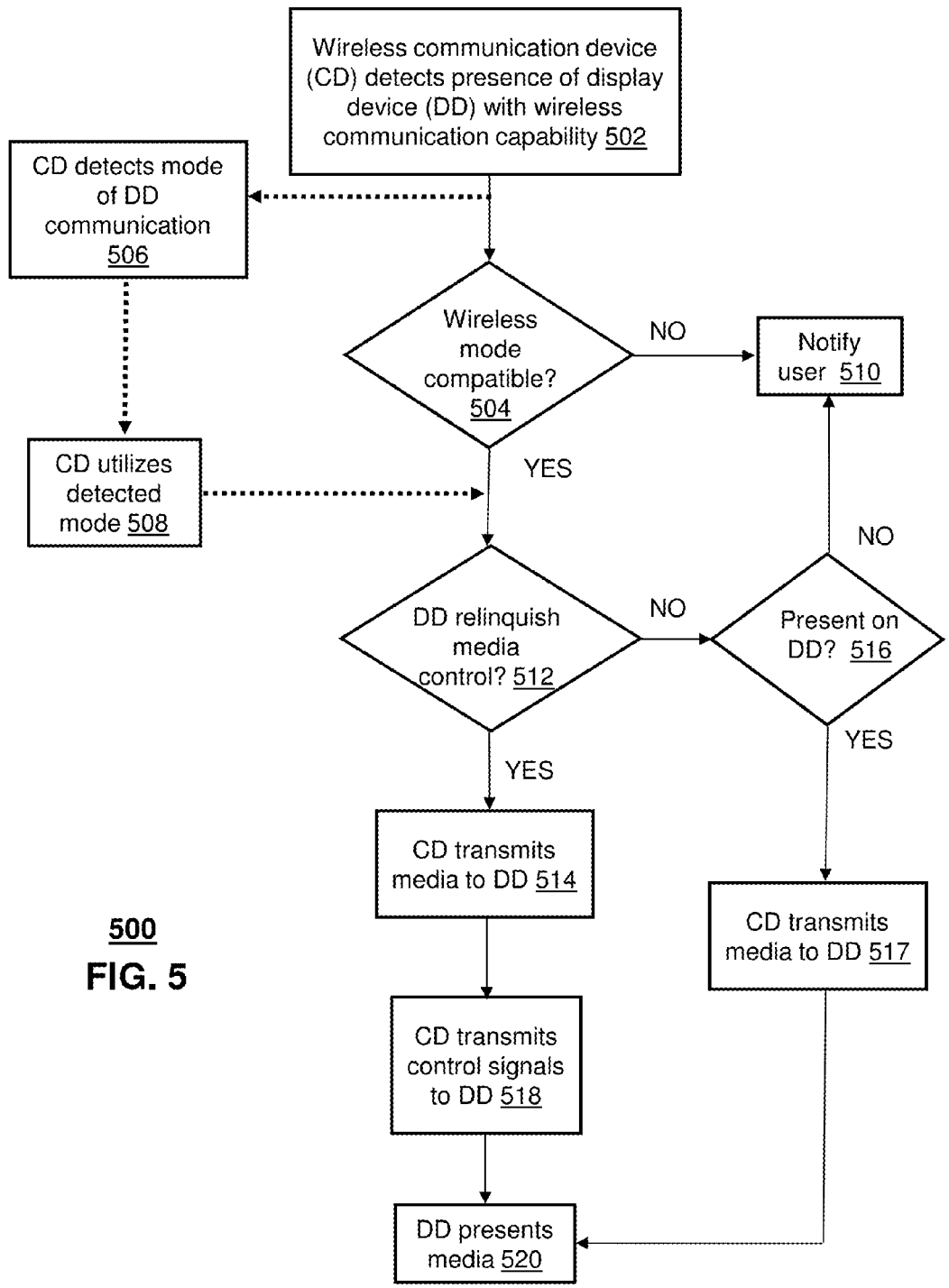
FIG. 5 depicts an exemplary method operating in portions of one or both of the communication systems.

FIG. 5 depicts an exemplary method 500 operating in portions of one or both of the communication systems 100 and 200. Method 500 has variants as depicted by the dashed lines. It would be apparent to an artisan with ordinary skill in the art that other embodiments not depicted in FIG. 5 are possible without departing from the scope of the claims described below.

Method 500 begins with step 502 where a wireless communication device 116 can detect the presence of a display device or other terminal for presentation of media, and which has wireless communication capability. The display device can be various devices or combinations of devices, including televisions, set top boxes, video games, desktop computers, monitors, and others. The presence of the display device can be detected by various techniques including transmitting a detection signal from the communication device 116 and/or monitoring for a presence signal from the display device. The detection of the display device with wireless communication capability can occur while the communication device 116 is being utilized for communication. For example, a wireless multimode communication device 116 can be communicating with another communication device using its first mode of communication (e.g., cellular communication), while its second mode of communication (e.g., WiMax) can determine the presence of the display device. A presence icon or other indicia can be presented on the communication device 116 to indicate to the user the presence of the display device with wireless communication capability. In another embodiment, any mode of communication of the communication device 116, including the first mode of communication as described above, can be utilized to detect the presence of a display device having compatible wireless capability.

In step 504, the communication device 116 can determine if the wireless mode of communication of the display device is compatible with the modes of communication available to the communication device. For example, a multimode cellular communication device 116 can have a second mode of communication using 802.11 protocol or other modes of communication, and can determine if this mode is compatible with the mode of communication utilized by the display device. In one embodiment, the communication device 116 can detect the mode of wireless communication capability of the display device as in step 506 and can select that mode from a plurality of modes of communication available to the multimode communication device as in step 508. For example, a multimode cellular communication device 116 can have the capability of communicating with a display device over one of its many modes of communication through selection of the compatible communication mode, such as cordless phone technology (e.g., DECT), Bluetooth™, WiFi, WiMAX, UWB, SDR, and RF.

If the communication device 116 and the display device are unable to communicate then in step 510 the user of the communication device can be notified of the incompatibility. In one embodiment, a presence icon or other indicia can be presented on the communication device 116 to indicate to the user whether the mode of wireless communication of the display device is compatible with a mode of communication of the multimode communication device. If on the other hand, the communication device 116 and the display device can communicate wirelessly, then in step 512 the communication device can determine whether the display device will relinquish control to the communication device over the presentation of media on the display device. In step 514, if the display device will relinquish control over presentation of the media to the communication device 116, then the communication device can begin transmitting the media to the display device.

If the display device will not relinquish control over the media to be presented then in step 516 the communication device 116 can present a selection to the user to determine whether he or she still wants to present the media on the display device. If the user decides that the media is not to be presented, such as by entering this selection on the communication device 116, then method 500 can return to step 510 by providing an acknowledgement that the media will not be transmitted to the display device. If on the other hand, the user decides that the media is to be presented on the display device, such as by entering this selection on the communication device 116, then the communication device 116 can transmit the media to the display device, as in step 517 which can result in the media being presented on the display device (step 520).

In step 518, the communication device 116 can transmit control signals to the display device to maintain control over the presentation of the media. The control signals can be transmitted using the mode of communication utilized for transmitting the media and/or can use another mode of communication. For example, a cellular communication device 116 can transmit the media to the display device using the second mode of communication (e.g., WiFi) and can transmit control signals using a third mode of communication (e.g., RF signals). In one embodiment, the communication device 116 can detect a remote control capability of the display device, such as whether the display device utilizes an RF remote control. In step 520, the media can be presented on the display device.

In one embodiment, the communication device 116 can display the remote control emulator 400 to facilitate control over the media presentation on the display device. For example, the display 310 of the communication device 116 can show the remote control emulator 400 with various keys typically found on a remote control, such as play, pause, fast forward, rewind, and the like. The communication device 116 can provide for manipulation of a highlighter or other cursor over each of the keys of the emulator 400 and for selection thereof through depressing of particular keys on the keypad 308 of the communication device.

The embodiments of method 500 provide a convenient way for an end user to present media on a more robust device, such as a television. The media transferred can be images, videos, music, user profiles, and so on. In one embodiment, the media can be associated with video games, such as player profiles, saved games, demonstration games, and so on. Any form of transferable data can be applied to the present disclosure.

From the foregoing descriptions, it would be evident to an artisan with ordinary skill in the art that the aforementioned embodiments can be modified, reduced, or enhanced without departing from the scope and spirit of the claims described below. For example, the communication device 116 can transmit the media to the display device using the same mode of communication it utilizes for longer distance communications. Similarly, multiple modes of communication can be utilized for transmitting the media from the communication device 116 to the display device, such as where the media includes multiple files of different formats or size. The communication device 116 can upload information from the display device that can be relevant to the presentation of the media, such as display parameters (e.g., color settings, resolution, and so on). For example, the display device can transmit parental controls to the communication device 116 to prevent the presentation of, or otherwise notify the user with respect to, media deemed inappropriate. The display device control over the presentation of the media can be selectively disabled based upon a number of factors, such as an identification of the communication device 116 that is transmitting the media. For example, the display device can relinquish control over the media to certain communication devices 116, while maintaining control with respect to other communication devices. In one embodiment, the communication device 116 and the display device can both maintain control over presentation of the media. In another embodiment, the selective disablement of the display device control can be pursuant to a selection by the user of the communication device (e.g., inputted into the communication device), by the user of the display device (e.g., inputted into the remote controller), and/or pre-determined by the display device (e.g., a pre-selection such as according to a communication device profile). The source of the media can be from the communication device 116 and/or can be from a third party. For example, the communication device 116 can authorize transmission of the media to the display device from a data storage facility, such as a remote mailbox associated with the communication device. These are but a few examples of the modifications that can be applied to the present disclosure without departing from the scope of the claims. Accordingly, the reader is directed to the claims for a fuller understanding of the breadth and scope of the present disclosure.

Figure 6:
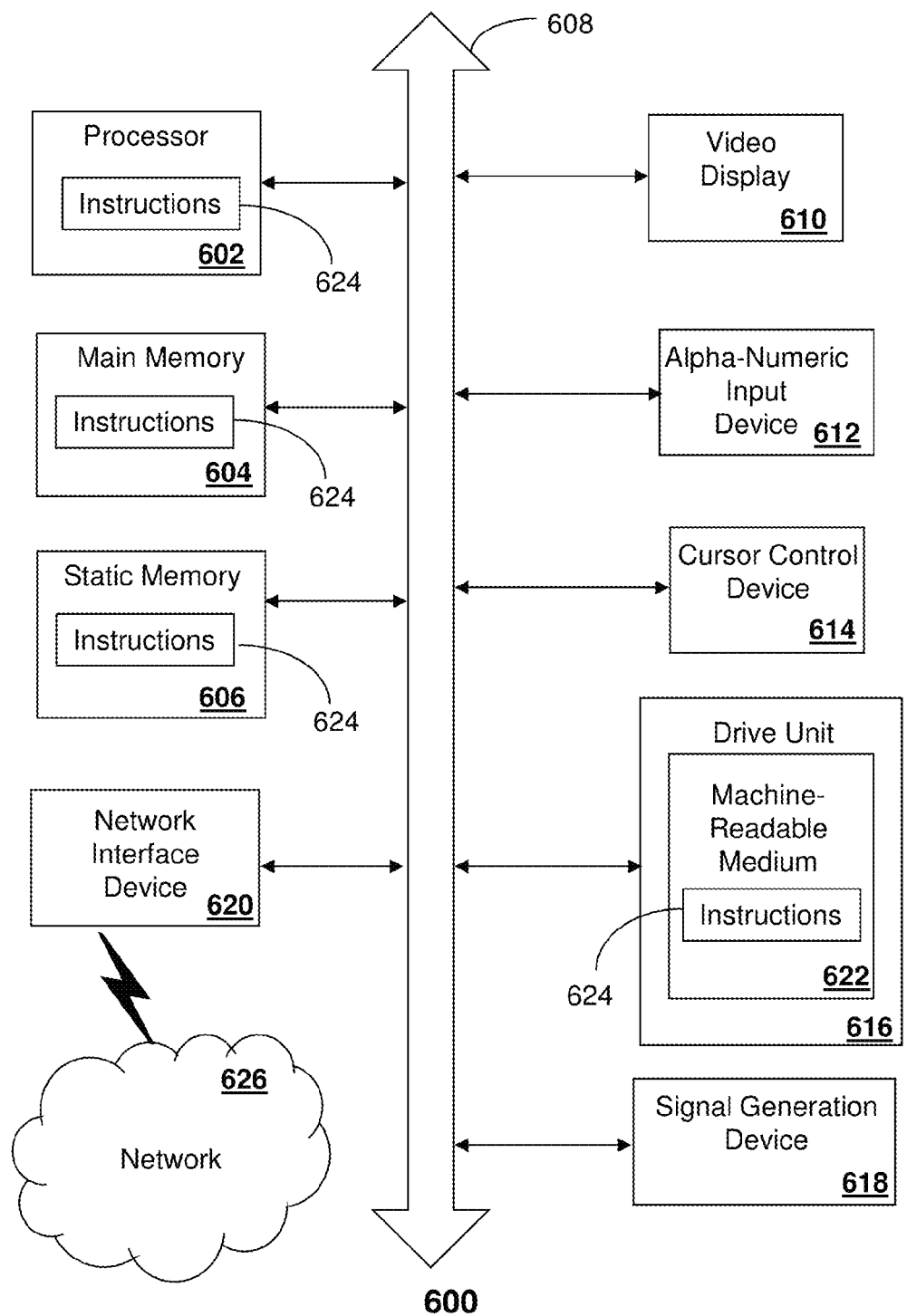
FIG. 6 depicts an exemplary diagrammatic representation of a machine in the form of a computer system within which a set of instructions, when executed, may cause the machine to perform any one or more of the methodologies disclosed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processing device comprising:
a memory to store instructions; and
a processor coupled to the memory, wherein the processor, responsive to executing the instructions, performs operations comprising:
wirelessly receiving a detection signal from a communication device;
wirelessly providing a presence signal for detection by the communication device;
determining whether a mode of communication of the processor is compatible with a mode of communication utilized by the communication device, thereby determining whether the processor and the communication device can communicate wirelessly;
in accordance with a determination that the processor and the communication device can communicate wirelessly, determining whether to relinquish control to the communication device over presentation of media at a presentation device;
in accordance with a determination to relinquish control,
wirelessly receiving a control signal from the communication device for control of the presentation of the media;
wirelessly receiving the media, and
presenting the media at the presentation device,
wherein the determination to relinquish control is based on an identity of the communication device; and
in accordance with a determination not to relinquish control,
wirelessly providing a message to the communication device, wherein in response to the message the communication device presents a selection to a user of the communication device regarding whether the media is to be presented at the presentation device.

2. The media processing device of claim 1, wherein the presence signal is presented as a presence icon at the communication device to indicate wireless communication capability of the processor, and wherein the processor comprises a plurality of processors operating in a distributed processing environment.

3. The media processing device of claim 2, wherein the communication device is a multimode communication device, and wherein the presence icon indicates whether any of a plurality of modes of communication available to the communication device upon detecting the processor is compatible with the mode of communication of the processor.

4. The media processing device of claim 1, wherein the media is received from a media source without the media being received from the communication device.

5. The media processing device of claim 4, wherein the media source comprises a mailbox of a data storage facility, the mailbox being associated with the communication device and remote from the communication device and from the processor.

6. The media processing device of claim 1, wherein the control signal is received according to a first mode of communication utilized by the communication device, and wherein the media is received according to a second mode of communication utilized by the communication device different from the first mode of communication.

7. The media processing device of claim 1, wherein the determination to relinquish control is based on a device profile stored in the memory.

8. The media processing device of claim 7, wherein the device profile identifies the communication device as an authorized communication device for receiving control over presentation of the media.

9. The media processing device of claim 1, wherein the media comprises a video game.

10. The media processing device of claim 1, wherein the processor comprises a set top box and wherein the presentation device comprises a television.

11. A method comprising:
    detecting, by a communication device comprising a processor, a media processing device, the communication device being remote from the media processing device;
    determining, by the communication device, whether any of a plurality of modes of communication available to the communication device upon detecting the media processing device is compatible with a mode of communication utilized by the media processing device;
    presenting, by the communication device, an icon according to the determining;
    wirelessly transmitting, by the communication device, control signals to the media processing device, subsequent to the detecting of the media processing device, for control of presentation of media at a presentation device by the communication device, wherein the control signals are wirelessly transmitted according to one of the plurality of modes of communication;
    wirelessly transmitting, by the communication device, a disable signal to the media processing device to cause the media processing device to disable other control functions regarding the presentation of the media at the presentation device while allowing the communication device to continue controlling presentation of the media via the control signals;
    displaying, by the communication device responsive to the media processing device disabling the other control functions, an emulator to facilitate remote control over the presentation of the media at the presentation device, the emulator comprising selectable keys and a cursor for selecting a key, wherein the selectable keys correspond to the other control functions, and wherein the other control functions include playing, pausing, rewinding, and fast forwarding of the presentation of the media;
    receiving and displaying, by the communication device responsive to the media processing device not disabling the other control functions, a message presenting a selection to a user of the communication device regarding whether the media is to be presented at the presentation device; and
    wirelessly transmitting the media to the media processing device responsive to the selection to present the media at the presentation device.

12. The method of claim 11, wherein the transmitting of the disable signal is based on an identity of the communication device.

13. The method of claim 12, wherein the control signals are transmitted according to a first mode of communication utilized by the communication device, and wherein the media is transmitted according to a second mode of communication utilized by the communication device different from the first mode of communication.

14. The method of claim 11, wherein the media is received by the media processing device from a media source without the media being received from the communication device, and wherein the media source comprises a mailbox of a data storage facility, the mailbox being associated with the communication device and remote from the communication device and from the media processing device.

15. The method of claim 11, wherein the detecting further comprises monitoring for a presence signal from the media processing device.

16. The method of claim 11, wherein the disabling of the other control over the presentation of the media is subject to approval by the media processing device based on a device profile stored at the media processing device that identifies the communication device as an authorized communication device for receiving control over presentation of the media.

17. A machine-readable storage device comprising instructions which, responsive to being executed by a processor of a communication device, cause the processor to perform operations comprising:
    detecting a media processing device, wherein the media processing device includes a presentation device, the communication device being remote from the media processing device;
    determining whether any of a plurality of modes of communication available to the communication device upon detecting the media processing device is compatible with a mode of communication utilized by the media processing device;
    wirelessly transmitting control signals to the media processing device for control of presentation of media at the presentation device;
    wirelessly transmitting a disable signal to the media processing device to cause the media processing device to disable control functions regarding the presentation of the media at the presentation device while allowing the communication device to continue controlling presentation of the media via the control signals; and
    displaying, responsive to the media processing device disabling the control functions, an emulator to facilitate remote control over the presentation of the media at the presentation device, the emulator comprising selectable keys and a cursor for selecting a key, wherein the selectable keys correspond to the control functions disabled at the media processing device, and wherein the control functions include playing, pausing, rewinding, and fast forwarding of the presentation of the media; and
    receiving and displaying, responsive to the media processing device not disabling the control functions, a message presenting a selection to a user of the communication device regarding whether the media is to be presented at the presentation device.

18. The machine-readable storage device of claim 17, further comprising wirelessly transmitting the media to the media processing device for presentation at the presentation device, wherein the transmitting of the disable signal is based on identity of the communication device.

19. The machine-readable storage device of claim 17, wherein the detecting further comprises monitoring for a presence signal from the media processing device and wherein the processor comprises a plurality of processors operating in a distributed processing environment.

20. The machine-readable storage device of claim 17, wherein the disabling of the control over the presentation of the media is subject to approval by the media processing device based on a device profile stored at the media processing device that identifies the communication device as an authorized communication device for receiving control over presentation of the media.

\* \* \* \* \*